(12) United States Patent
Wright

(10) Patent No.: US 10,369,946 B1
(45) Date of Patent: Aug. 6, 2019

(54) BUMPER SHIELD

(71) Applicant: Leon Wright, Orlando, FL (US)

(72) Inventor: Leon Wright, Orlando, FL (US)

(*) Notice: Subject to any disclaimer, the term of this patent is extended or adjusted under 35 U.S.C. 154(b) by 41 days.

(21) Appl. No.: 15/689,083

(22) Filed: Aug. 29, 2017

(51) Int. Cl.
| | |
|---|---|
| *B60R 19/44* | (2006.01) |
| *B62D 35/02* | (2006.01) |
| *B65D 25/20* | (2006.01) |
| *B60R 13/04* | (2006.01) |
| *C09J 7/04* | (2006.01) |
| *D04H 3/005* | (2012.01) |
| *D04H 3/018* | (2012.01) |
| *B60R 11/00* | (2006.01) |

(52) U.S. Cl.
CPC ............ *B60R 19/445* (2013.01); *B60R 13/04* (2013.01); *C09J 7/045* (2013.01); *D04H 3/005* (2013.01); *D04H 3/018* (2013.01); *B60R 2011/0063* (2013.01)

(58) Field of Classification Search
CPC .................. B60R 19/445; B60R 13/04; B60R 2011/0063; C09J 7/045; D04H 3/005; D04H 3/018

USPC .......................................................... 293/142
See application file for complete search history.

(56) References Cited

U.S. PATENT DOCUMENTS

| | | | |
|---|---|---|---|
| 7,338,100 B2* | 3/2008 | Meyer ..................... | B60R 19/44 150/166 |
| 2011/0198874 A1* | 8/2011 | Lee .......................... | B60R 19/44 293/142 |

* cited by examiner

*Primary Examiner* — Joseph D. Pape
*Assistant Examiner* — Dana D Ivey
(74) *Attorney, Agent, or Firm* — Kyle A. Fletcher, Esq.

(57) ABSTRACT

The bumper shield is a protective structure that mounts on a vehicle. The vehicle is further defined with a bumper and a trunk. The bumper is further defined with a superior surface. The bumper shield attaches to the superior surface of the bumper. The position of the bumper shield on the bumper is such that the bumper shield protects the bumper from impact damage caused by cargo hitting the bumper as the cargo is loaded and removed from the trunk. The bumper shield forms a sacrificial surface that separates the bumper and the cargo being loaded into the trunk. The bumper shield comprises a base strip and a parchment. The base strip attaches to the bumper. The parchment protects the base strip during storage of the bumper shield.

15 Claims, 4 Drawing Sheets

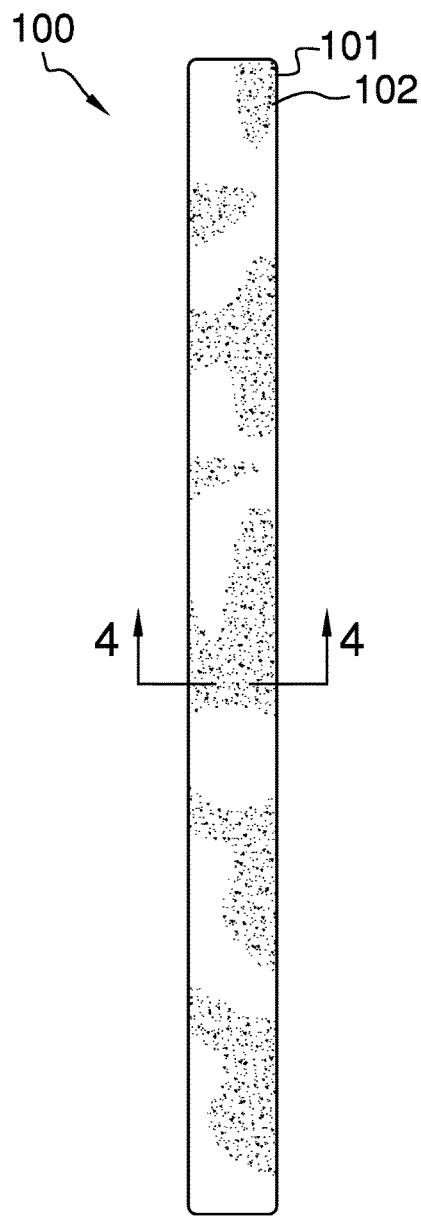
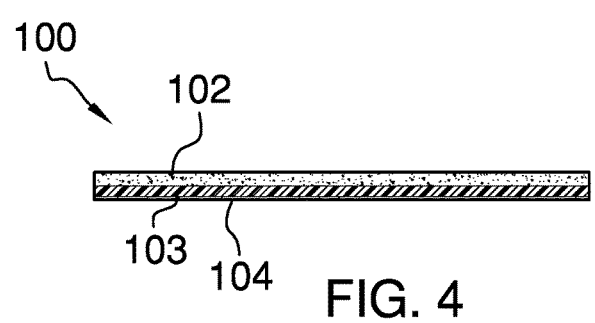
FIG. 3
FIG. 4

BUMPER SHIELD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting including vehicles and vehicle fittings, more specifically, an external guard strip for a vehicle.

SUMMARY OF INVENTION

The bumper shield is a protective structure that mounts on a vehicle. The vehicle is further defined with a bumper and a trunk. The bumper is further defined with a superior surface. The bumper shield attaches to the superior surface of the bumper. The position of the bumper shield on the bumper is such that the bumper shield protects the bumper from impact damage caused by cargo hitting the bumper as the cargo is loaded and removed from the trunk. The bumper shield forms a sacrificial surface that separates the bumper and the cargo being loaded into the trunk. The bumper shield comprises a base strip and a parchment. The base strip attaches to the bumper. The parchment protects the base strip during storage of the bumper shield.

These together with additional objects, features and advantages of the bumper shield will be readily apparent to those of ordinary skill in the art upon reading the following detailed description of the presently preferred, but nonetheless illustrative, embodiments when taken in conjunction with the accompanying drawings.

In this respect, before explaining the current embodiments of the bumper shield in detail, it is to be understood that the bumper shield is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bumper shield.

It is therefore important that the claims be regarded as including such equivalent construction insofar as they do not depart from the spirit and scope of the bumper shield. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a top view of an embodiment of the disclosure.

FIG. 4 is a cross-sectional view of an embodiment of the disclosure across 4-4 as shown in FIG. 3.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
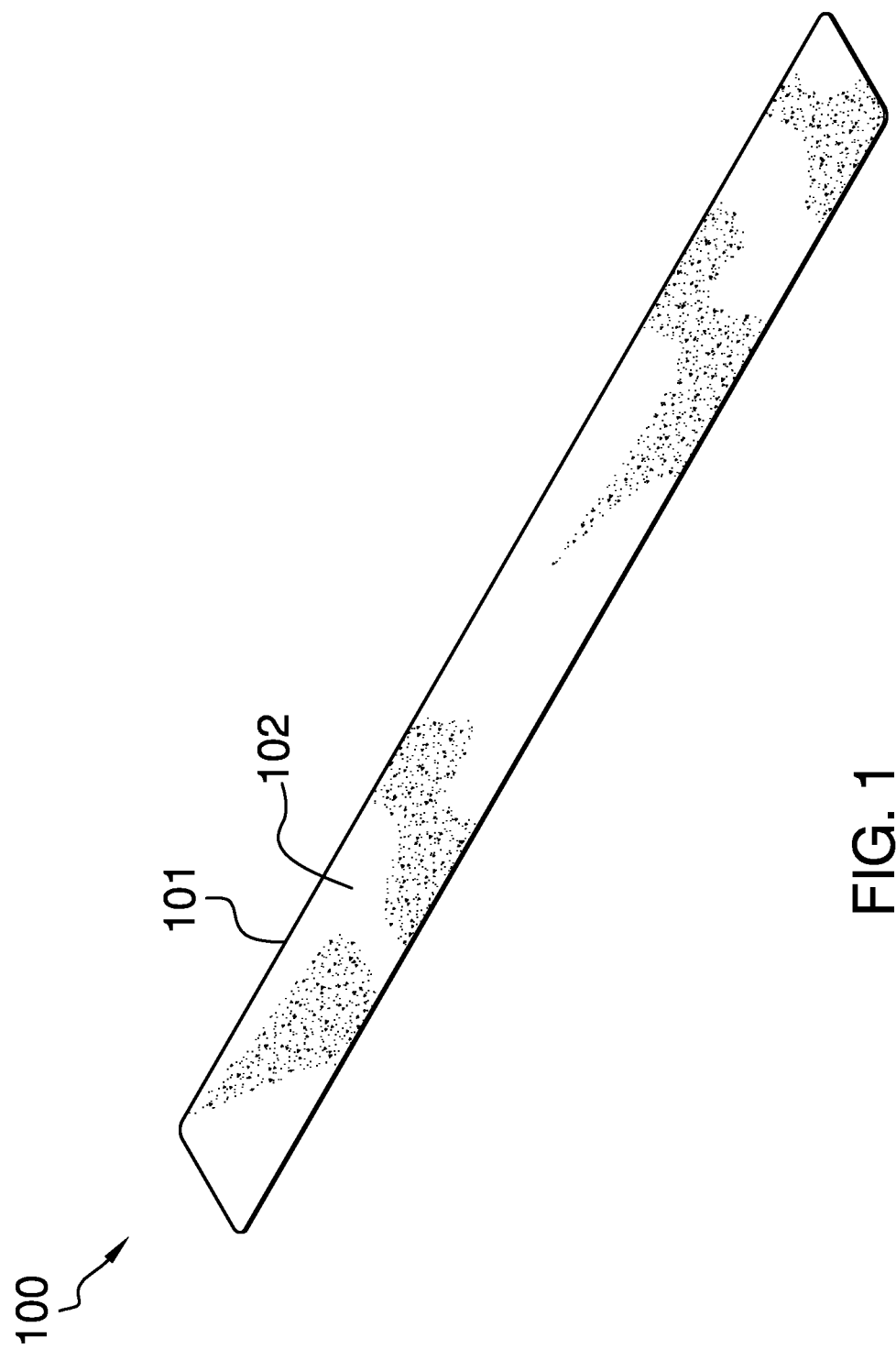
FIG. 1 is a perspective view of an embodiment of the disclosure.
Figure 2:
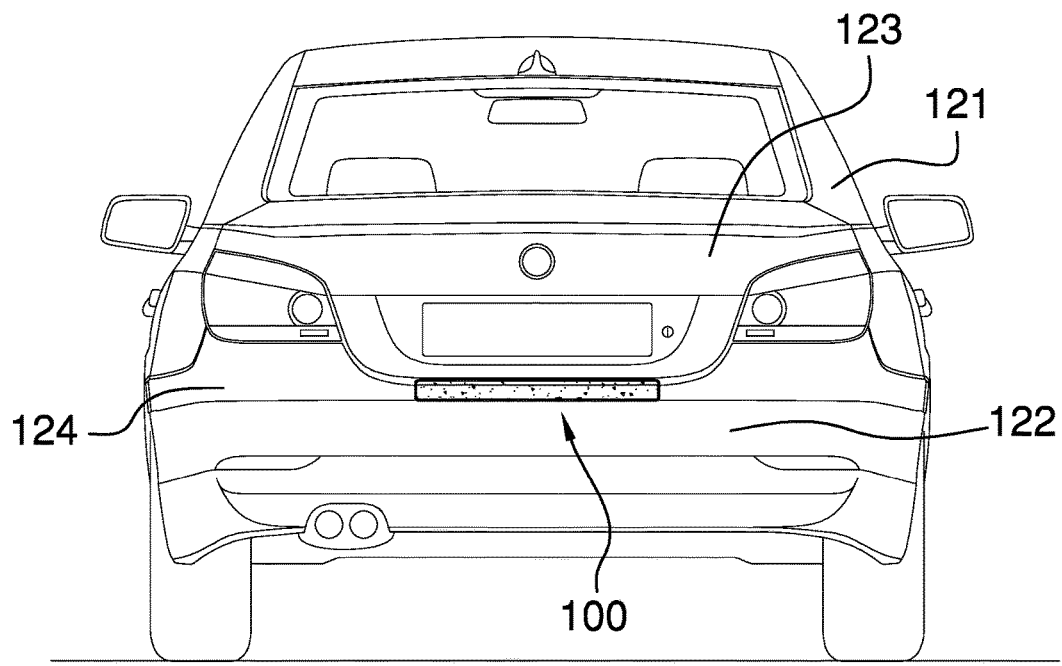
FIG. 2 is an in use view of an embodiment of the disclosure.
Figure 5:
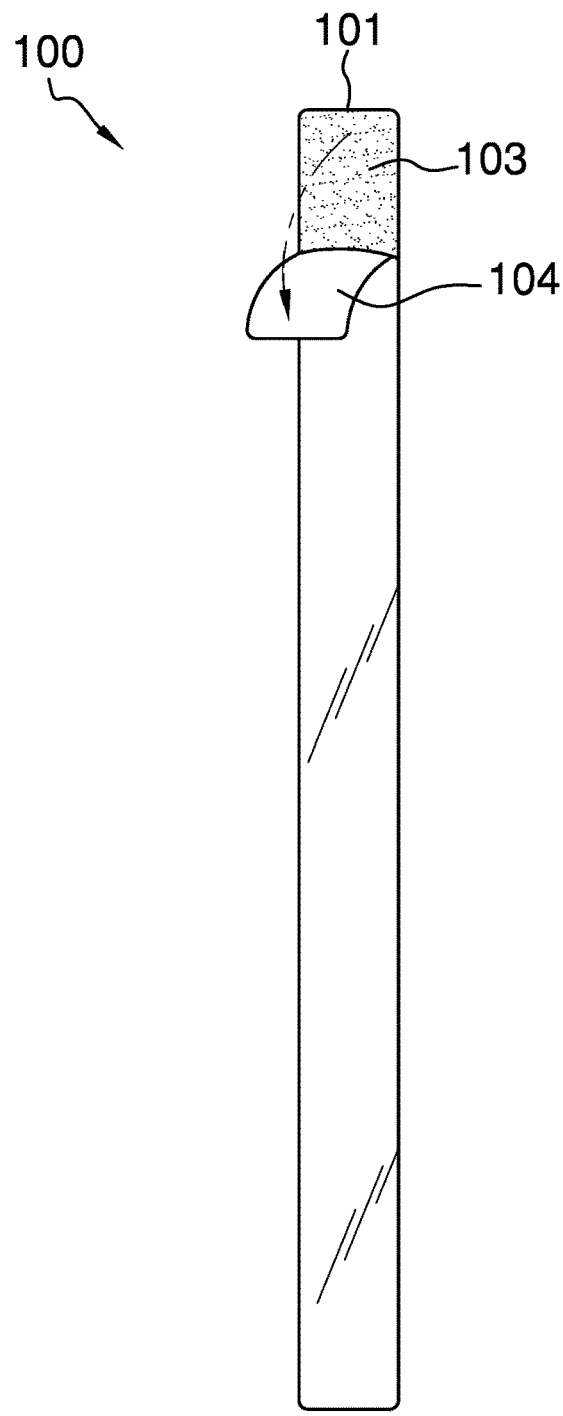
FIG. 5 is a bottom view of an embodiment of the disclosure.

Detailed reference will now be made to one or more potential embodiments of the disclosure, which are illustrated in FIGS. 1 through 5.

The bumper shield 100 (hereinafter invention) is a protective structure that mounts on a vehicle 121. The vehicle 121 is further defined with a bumper 122 and a trunk 123. The bumper 122 is further defined with a superior surface 124. The invention 100 attaches to the superior surface 124 of the bumper 122. The trunk 123 contains cargo 125. The position of the invention 100 is such that the invention 100 protects the bumper 122 from impact damage caused by mishandled cargo 125 hitting the bumper 122 as the cargo 125 is loaded and removed from the trunk 123. The invention 100 forms a sacrificial surface that separates the bumper 122 and the cargo 125 being loaded into the trunk 123. The invention 100 comprises a base strip 101 and a parchment 104. The base strip 101 attaches to the bumper 122. The parchment 104 protects the base strip 101 during storage of the invention 100.

The vehicle 121 refers to a motorized device that is intended to carry passengers and cargo 125 over a road network. The bumper 122 is a horizontal structure that attaches to a vehicle 121. The bumper 122 is a sacrificial structure intended to reduce collision damage. The trunk 123 is a cargo 125 storage space formed within the vehicle 121. The superior surface 124 refers to the surface of the bumper 122 that is distal from the road network used by the vehicle 121. The cargo 125 refers to one or more objects transported by the vehicle 121.

The base strip 101 is a sheeting that forms a sacrificial structure. The base strip 101 is formed in a shape selected from the group consisting of a rectangular shape, a rounded rectangular shape or an oval shape. The base strip 101 is further defined with a superior face 111 and an inferior face 112. The superior face 111 is the face of the base strip 101 that is distal from the bumper 122 during normal use of the invention 100. The inferior face 112 is the face of the base strip 101 that attaches to the superior surface 124 of the bumper 122 during normal use of the invention 100.

In the first potential embodiment of the disclosure, the base strip 101 comprises a textile formed with poly-para-phenylene terephthalamide (CAS 25035-37-4) yarns. The use of poly-para-phenylene terephthalamide (CAS 25035-37-4) yarns in the base strip 101 improves the durability of the base strip 101 to withstand scuffs that may occur when cargo 125 is loaded into the trunk 123 of the vehicle 121.

The base strip 101 mounts on the superior surface 124 of the bumper 122 of the vehicle 121 such that cargo 125 moves over the base strip 101 as the cargo 125 is loaded into the trunk 123 of the vehicle 121. From this position, the base strip 101 acts as a barrier that: 1) physically separates the bumper 122 from the cargo 125; and, 2) directly receives impacts from mishandled cargo 125.

The base strip 101 further comprises a pebbled surface 102 and an adhesive surface 103.

The pebbled surface 102 is a granulated surface. The pebbled surface 102 is formed on the superior face 111 of the base strip 101. The intention of the pebbled surface 102 is to physically receive the impact of the mishandled cargo 125 instead of the bumper 122. The pebbled surface 102 forms a non-skid surface. The purpose of the non-skid surface is to limit skidding of the mishandled cargo 125 after it has impacted with the pebbled surface 102. The prevention of skidding by the pebbled surface 102 limits the overall damage to the invention 100 and the bumper 122 caused by the mishandled cargo 125. In the first potential embodiment of the disclosure, the pebbled surface 102 is applied as a coating to the base strip 101. Methods to form a pebbled surface 102 in a sheeting are well-known and documented in the mechanical arts.

The adhesive surface 103 is an adhesive coating applied to the inferior face 112 of the base strip 101. The adhesive surface 103 attaches the base strip 101 to the superior surface 124 of the bumper 122 such that the pebbled surface 102 of the base strip 101 forms the superior boundary of the invention 100.

In the first potential embodiment of the disclosure, the adhesive surface 103 is a commercially available pressure sensitive adhesive. The use of a pressure sensitive adhesive for the adhesive surface 103 allows the invention 100 to be applied to the bumper 122 without the use of specialized equipment or procedures.

The parchment 104 is a silicone treated paper sheeting. The parchment 104 is formed in a shape selected from the group consisting of a rectangular shape, a rounded rectangular shape or an oval shape. The form of the parchment 104 is congruent to the form of the base strip 101 such that the parchment 104 may be overlaid on and aligned with the base strip 101. The parchment 104 aligns with and lays over the adhesive surface 103 of the base strip 101. The parchment 104 protects the adhesive surface 103 from the environment until the adhesive surface 103 is used to attach the base strip 101 to the bumper 122. The parchment 104 is disposable once the base strip 101 attaches to the bumper 122.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Automobile: As used in this disclosure, an automobile is a road vehicle that specializes in carrying passengers and light cargo loads. This definition is specifically intended to include vehicles referred to as pickup trucks, vans, minivans, and sport utility vehicles.

Cargo: As used in this disclosure, cargo refers to one or more objects that are intended to be transported using a vehicle.

Congruent: As used in this disclosure, congruent is a term that compares a first object to a second object. Specifically, two objects are said to be congruent when: 1) they are geometrically similar; and, 2) the first object can be superimposed over the second object such that the first object aligns, within manufacturing tolerances, with second object.

Correspond: As used in this disclosure, the term correspond means that a first object is in some manner linked to a second object in a one to one relationship.

Disposable: As used in this disclosure, disposable is an adjective that refers to an object that is designed and intended for a single use. Within this context, an object disposable if it is not reusable after its initial use.

Geometrically Similar: As used in this disclosure, geometrically similar is a term that compares a first object to a second object wherein: 1) the sides of the first object have a one to one correspondence to the sides of the second object; 2) wherein there is a proportional difference between each pair of corresponding sides is the same; 3) the angles formed by the first object have a one to one correspondence to the angles of the second object; and, 4) wherein the corresponding angles are equal.

Granule: As used in this disclosure, refers to an individual particle selected from a plurality of particles that represents a material. A material formed from a plurality of granules is said to be a granular or granulated material. The verb granulate refers to the formation of granules to create a granular material Granulated Surface: As used in this disclosure, a granulated surface refers to a surface of an object formed from a granulated material. A pebbled surface is a granulated surface.

Inferior: As used in this disclosure, the term inferior refers to a directional reference that is parallel to and in the same direction as the force of gravity.

Non-Skid Material: As used in this disclosure, a non-skid material is a commercially available product applied to an object such that non-skid material inhibits the object from sliding along the surface upon which the object is resting. Non-skid materials are often, but not always, adhesive or abrasive materials.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Oval: As used in this disclosure, an oval is a geometric shape formed in the shape of a "squished" circle similar in form to an ellipse. The difference between an oval and an ellipse is that an ellipse can be described by a mathematical formula while an oval has no such description. The term ovoid refers to a three-dimensional structure with an oval shape that is analogous to the relationship of an ellipsoid and an ellipse.

Polymer: As used in this disclosure, a polymer refers to a molecular chain that comprises multiple repeating units. The repeating unit may be an atom or a molecular structure.

Pressure Sensitive Adhesive: As used in this disclosure, a pressure sensitive adhesive is an adhesive that is a permanently tacky adhesive that is activated by the application of pressure.

Rounded: A used in this disclosure, the term rounded refers to the replacement of an apex, vertex, or edge or brink of a structure with a (generally smooth) curvature wherein the concave portion of the curvature faces the interior or center of the structure.

Sacrificial Structure: As used in this disclosure, a sacrificial structure is a first object or structure that protects a second object or structure from damage. More specifically, the sacrificial structure protects the second object or structure by being damaged instead of the second object or structure.

Silicone: As used in this disclosure, silicone is a substance formed from silicon (Si) and oxygen (O) that forms the backbone of polymer type chains similar to polymers that are formed by carbon. Though exceptions do exist, silicone is considered to be less reactive and to have better heat resistance when compared to most common carbon based polymers.

Sheeting: As used in this disclosure, a sheeting is a material, such as a textile, a plastic, or a metal foil, in the form of a thin flexible layer or layers.

Superior: As used in this disclosure, the term superior refers to a directional reference that is parallel to and in the opposite direction of the force of gravity.

Textile: As used in this disclosure, a textile is a material that is woven, knitted, braided or felted. Synonyms in common usage for this definition include fabric and cloth.

Trunk: As used in this disclosure, a trunk refers to a cargo storage space formed in a vehicle that is directly accessible from the exterior of the vehicle.

Vehicle: As used in this disclosure, a vehicle is a motorized device used for transporting passengers, goods, or equipment. The term motorized vehicle refers to a vehicle can move under power provided by an electric motor or an internal combustion engine.

Yarn: As used in this disclosure, a yarn is a continuous strand of textile fibers and filaments. Yarns are used in the production of fabrics. For this disclosure, this definition explicitly includes yarns formed from a single filament such as a monofilament yarn.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A guard strip protective structure mounted on a vehicle which includes a bumper and a trunk, the bumper having a superior surface and the trunk is configured to contain cargo, the guard strip is attached to the bumper and forms a surface that separates the bumper and the cargo loaded into the trunk, the guard strip comprising: a base strip and a parchment; wherein the base strip attaches to the bumper in a position where the guard strip protects the bumper from impact damage from mishandled cargo and directly receives impacts from the mishandled cargo, the base strip is a barrier which physically separates the bumper from the cargo and the base strip is a sheeting that forms a sacrificial structure; and wherein the base strip is further defined with a superior face and an inferior face, the superior face is the face of the base strip that is distal from the bumper during normal use of the guard strip, the inferior face is the face of the base strip that attaches to the superior surface of the bumper during normal use of the guard strip, and the base strip comprises a textile formed with poly-para-phenylene terephthalamide (CAS 25035-37-4) yarns.

2. The guard strip according to claim 1 wherein the base strip mounts on the superior surface of the bumper of the vehicle such that the cargo moves over the base strip as the cargo is loaded into the trunk of the vehicle.

3. The guard strip according to claim 2
wherein the base strip further comprises a pebbled surface that is formed on the superior face of the base strip;
wherein the pebbled surface physically receives the impact of the mishandled cargo.

4. The guard strip according to claim 3 wherein the pebbled surface is a granulated surface.

5. The guard strip according to claim 4 wherein the pebbled surface forms a non-skid surface.

6. The guard strip according to claim 5 wherein the pebbled surface is applied as a coating to the base strip.

7. The guard strip according to claim 6 wherein the base strip further comprises an adhesive surface.

8. The guard strip according to claim 7 wherein the adhesive surface is applied to the inferior face of the base strip.

9. The guard strip according to claim 8 wherein the adhesive surface attaches the base strip to the superior surface of the bumper such that the pebbled surface of the base strip forms the superior boundary of the guard strip.

10. The guard strip according to claim 9 wherein the adhesive surface is a pressure sensitive adhesive.

11. The guard strip according to claim 10 wherein the parchment is a silicone treated paper based sheeting.

12. The guard strip according to claim 11
wherein the base strip is formed in a shape selected from the group consisting of a rectangular shape, a rounded rectangular shape or an oval shape;
wherein the parchment is formed in a shape selected from the group consisting of a rectangular shape, a rounded rectangular shape or an oval shape.

13. The guard strip according to claim 12 wherein the shape of the parchment is congruent to the shape of the base strip.

14. The guard strip according to claim 13 wherein the parchment aligns with and lays over the adhesive surface of the base strip.

15. The guard strip according to claim 14 wherein the parchment is disposable once the base strip attaches to the bumper.

* * * * *